United States Patent [19]

Doom

[11] 3,999,691
[45] Dec. 28, 1976

[54] CAKE FILLER

[76] Inventor: Lewis G. Doom, 95 Meadow Farm Road, East Islip, N.Y. 11730

[22] Filed: July 16, 1975

[21] Appl. No.: 596,248

[52] U.S. Cl. .............................. 222/330; 222/334; 222/571; 141/244
[51] Int. Cl.² ........................................ G01F 11/32
[58] Field of Search .......... 222/375, 571, 330, 334, 222/309; 141/115, 116, 117, 119, 244, 329

[56] References Cited

UNITED STATES PATENTS

| | | | |
|---|---|---|---|
| 2,646,190 | 7/1953 | Hensgen et al. | 222/334 |
| 2,721,008 | 10/1955 | Morgan, Jr. | 222/571 X |
| 3,490,654 | 1/1970 | Fischer | 222/330 X |
| 3,497,111 | 2/1970 | Savage | 222/309 X |
| 3,911,972 | 10/1975 | Hubers et al. | 141/115 |

FOREIGN PATENTS OR APPLICATIONS

| | | | |
|---|---|---|---|
| 2,126,581 | 12/1971 | Germany | 222/571 |

Primary Examiner—Allen N. Knowles
Assistant Examiner—Hadd Lane
Attorney, Agent, or Firm—Hopgood, Calimafde, Kalil, Blaustein & Lieberman

[57] ABSTRACT

Dispensing apparatus for semi-fluid material includes a housing having a vertical bore and a second bore connecting with this vertical bore. A piston is slidably mounted within said second bore and is movable between a first position spaced from the vertical bore and a second position adjacent to the vertical bore. Fluid pressure is applied through a first channel to a first piston surface to cause the piston to move from a first to the second position. Fluid pressure is applied through a second channel to a second piston surface to cause the piston to move back to the first position from the second position. An input aperture connects the vertical bore in the housing to an interconnecting array of branching channels which are in turn connected through a plurality of apertures to dispensing members. The channels in this array are configured such that the pressure drop between the input aperture to the array and the inputs of each of the dispensing members is equal.

3 Claims, 4 Drawing Figures

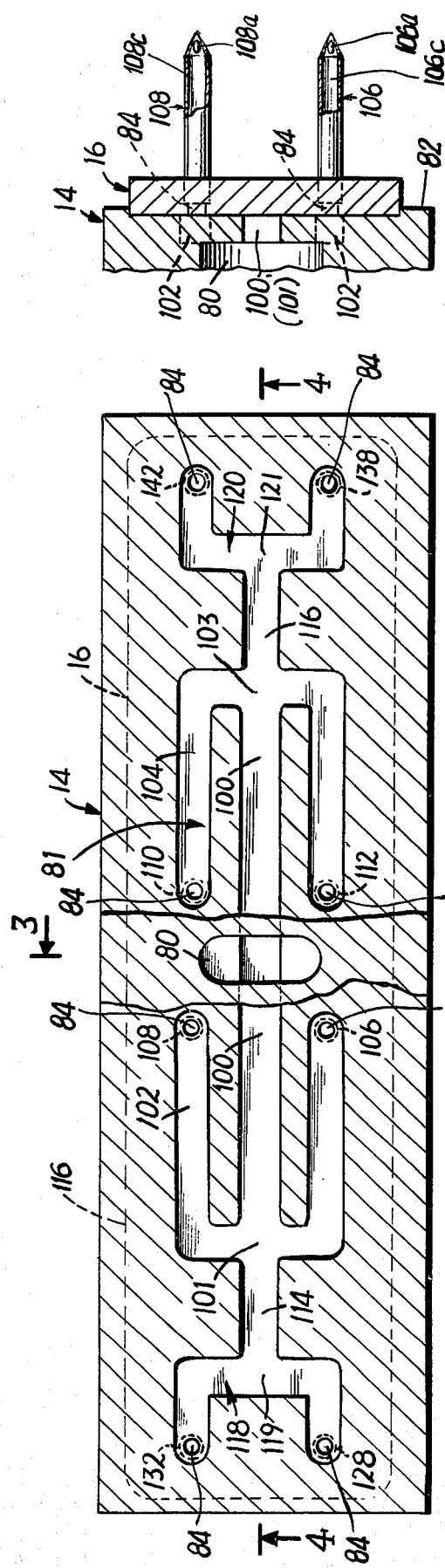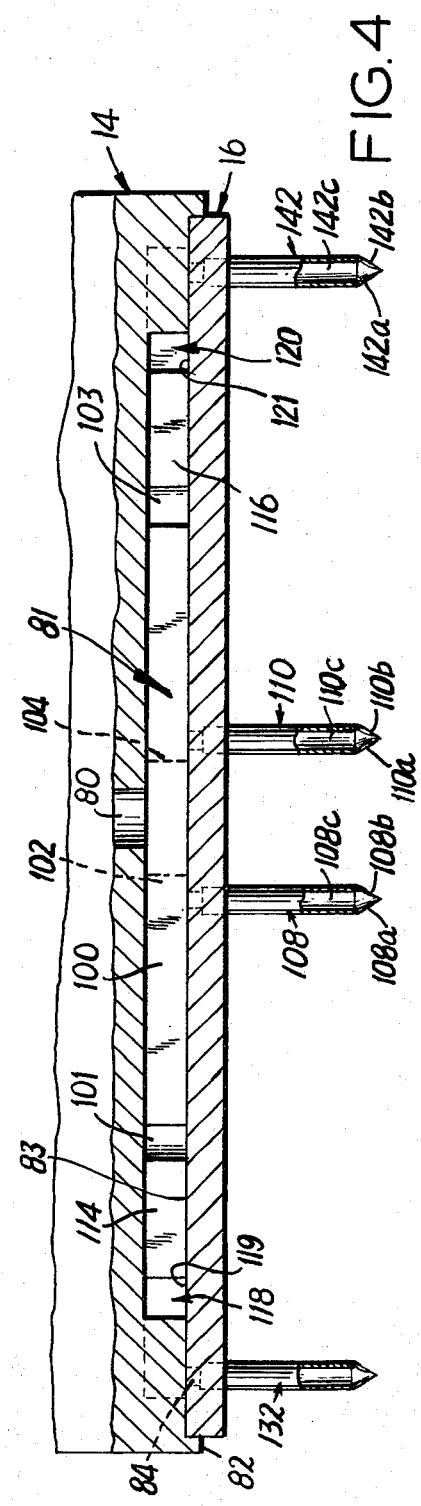

CAKE FILLER

BACKGROUND OF THE INVENTION

This invention relates to apparatus for dispensing semi-fluid materials such as cream fillings for bakery products. In machinery for mass producing bakery products raw materials for such fillings are mixed and supplied in a semi-fluid state under pressure to a dispensing apparatus. Such dispensing apparatus includes a frame which supports a conveyor and a movable dispensing head. The dispensing head customarily includes a manifold which receives the semi-fluid mixture under pressure from the mixer, a nozzle plate, a slider valve between the manifold and nozzle plate and a needle plate having a number of dispensing needles connected thereto.

The nozzle plate includes a number of vertical bores each of which extends between the slider valve and one or more channels opening into the needle plate. A transverse bore having a movable piston mounted therein connects with each of the vertical bores and provides suction pressure to draw the semi-fluid material to be dispensed back into the nozzle plate in a manner described more fully below. The nozzle plate includes a number of channels connecting through apertures in the needle plate to the input openings of a number of needle like dispensing members which extend downwardly from the needle plate and terminate in dispensing orifices.

Sheets or pans containing the products to be filled are moved under the dispensing head by the conveyor of the dispensing apparatus. The dispensing head is then lowered causing the needle-like members to pierce the products. When the slider valve is opened and the movable piston is activated, the semi-fluid material is forced under pressure through the nozzle plate and through the needle plate into the needle-like dispensers. The material passes through the apertures in the needle-like dispensers and into the products to be filled. After one group of products has been filled the slider valve is closed, the piston is returned to its original position and the dispensing head is lifted in preparation for filling the next group of products which the conveyor moves into filling position.

Because the semi-fluid material must pass through relatively narrow passages and because it is customarily aerated, there is a tendency for it to continue to expand after the slider valve has closed causing it to extrude from the apertures in the needle-like dispensers during and after their withdrawal from the products to be filled. This is undesirable since this excess of extruded semi-fluid material will be dripped or smeared onto the exterior surface of the next group of products to be filled resulting in unsightly products.

The piston mentioned above is intended to prevent the extrusion of this excess semi-fluid material by creating a suction in the system when it returns to its original position. Since the slider valve is closed when the piston returns this suction is applied through the needle plate to the dispensing needles and sucks this material back into the needles. In prior art apparatus of this type a spring has been utilized to return the piston to its starting position and thereby create the desired suction pressure. It has been found, however, that the spring used for this purpose is prone to frequent failures with the result that the piston returns too slowly or completely fails to return and the necessary suction pressure is not provided. The present invention solves this prior art problem by providing an improved more reliable means to return the piston to its starting position within the transverse bore.

It is also important that the fluid pressure at the output of each of the needle-like dispensers be equal in order to insure uniform filling of each product. Since customarily several of these needle-like dispensers are supplied from a single inlet port through channels formed in the lower surface of the nozzle plate which channels communicate with apertures extending through the needle plate to individual dispensing needles located at varying distances from this inlet port it has been difficult to insure that a uniform amount of the semi-fluid material will be dispensed by each needle. In the past it has been customary to provide a larger or smaller needle plate apertures depending upon the distance of the applicable needle from the input aperture in an effort to equalize the fluid pressure at the input of each dispensing needle. This solution required the use of very small diameter apertures to service those needles closest to the input aperture. These very small apertures tended to become clogged. The present invention solves this problem by configuring the channels in the lower surface of the nozzle plate to provide a uniform pressure drop between the inlet port and each of the needle-like dispensers.

SUMMARY OF THE INVENTION

The invention is directed to dispensing apparatus for semi-fluid material which includes a source of the material, a housing and valve means disposed between the source and the housing. The housing has a first vertically disposed bore communicating with the valve means and a second bore having a first end communicating with the first bore. A piston is slidably mounted within the second bore so that it is movable between a first predetermined position spaced from the first end of the second bore to a second predetermined position adjacent to the first end of the second bore. The piston includes first and second surfaces. First means are provided to apply fluid pressure to the first piston surface to cause the piston to move from the first to the second predetermined positions and second means are provided to apply fluid pressure to the second piston surface to cause the piston to move from the second predetermined position to the first predetermined position.

The housing may further include an aperture communicating with the first bore and an array of interconnecting channels formed on an exterior surface of the housing such that the array of channels connects the aperture to a plurality of dispensing members. The configuration of the channels of this array are chosen such that the pressure drop between the aperture and all of the dispensing members is equal.

DESCRIPTION OF THE DRAWINGS

FIG. 2 is a view of the channel arrangement of the dispensing apparatus.

FIG. 3 is a cross sectional view of the channel arrangement taken along plane 3—3 of FIG. 2.

FIG. 4 is a cross sectional view of the channel arrangement taken along plane 4—4 of FIG. 2.

DESCRIPTION OF THE INVENTION

Figure 1:
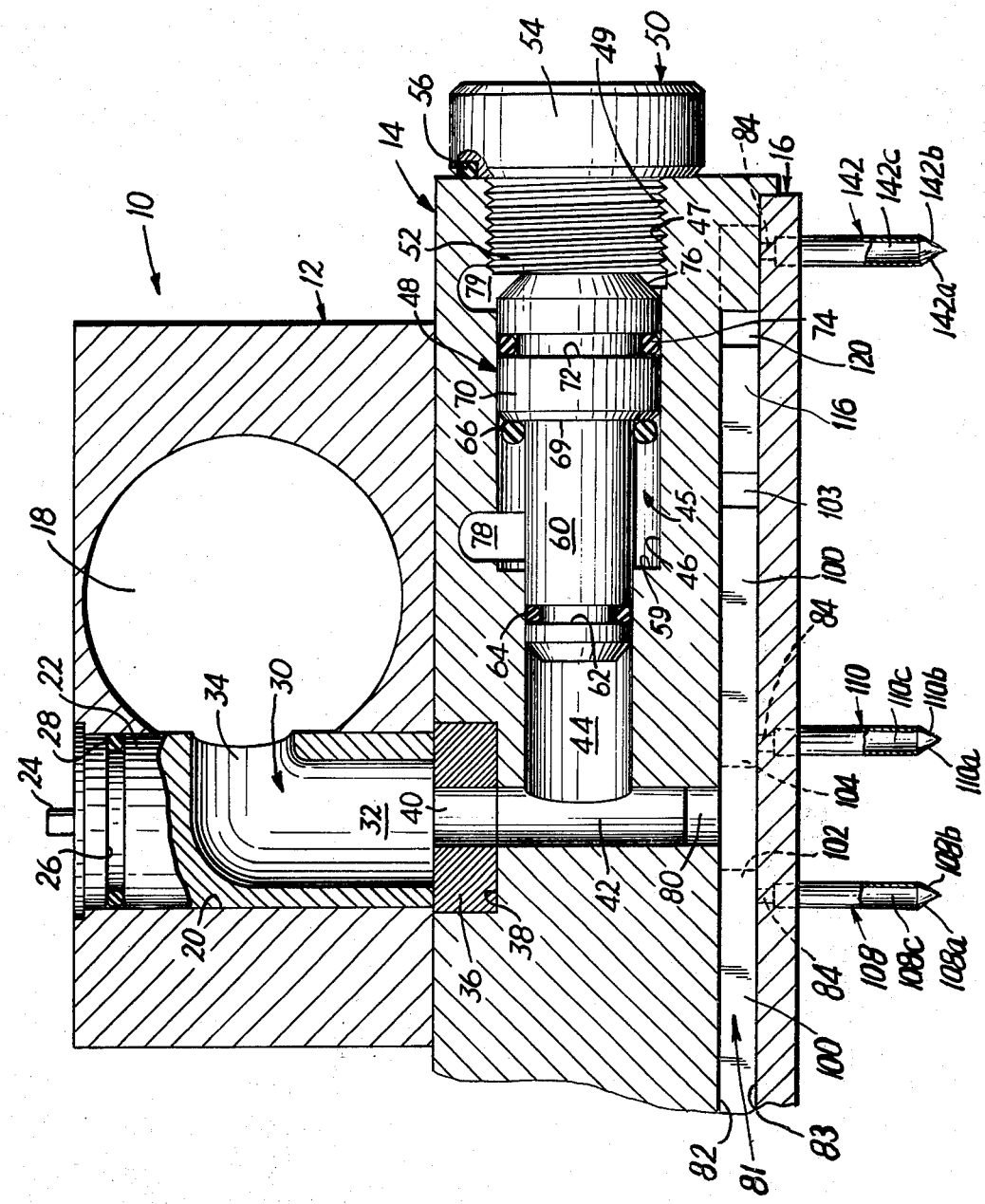
FIG. 1 is a cross sectional view of the dispensing apparatus of the present invention.

FIG. 1 is a cross sectional view of a dispensing head 10 including a manifold 12, a nozzle plate 14 and a needle plate 16. The manifold 12 includes a longitudinally disposed supply channel 18 which is connected to a source of semi-fluid material which source may be for instance a continuous mixer. The manifold 12 further includes one or more verticle bores 20. A cylindrical member 22 is configured to fit slidably within each bore 20 so that it can be rotated within the bore 20 by means of the exterior portion 24 of cylindrical member 22. A peripheral groove 26 and a surrounding O ring 28 mounted in groove 26 may be provided to insure a liquid tight seal between cylindrical member 22 and bore 20. Cylindrical member 22 includes an interior bore 30 having a vertically disposed portion 32 and a transversely disposed portion 34. The transversely disposed portion 34 is adopted to connect with supply channel 18 to permit the flow of semi-fluid material into bore 30 when member 22 is rotated to a predetermined orientation. Rotation of member 22 by portion 24 will vary the opening between bore 30 and supply channel 18 from fully opened to fully closed with intermediate positions which can be utilized to vary the fluid pressure in bore 30.

Slidable valve plate 36 is disposed within a longitudinal groove 38 in nozzle plate 14. At least one aperture 40 extends through valve plate 36. Valve plate 36 is movable into and out of the plane of FIG. 1 so that aperture 40 is movable into and out of correspondence with bore 30. Valve plate 36, thereby, forms a sliding valve between manifold 12 and nozzle plate 14 which may be activated at predetermined times by any suitable mechanical apparatus many of which are known in the art.

In its open position aperture 40 of valve plate 36 provides an opening into a vertical bore 42 which extends through nozzle plate 14 and connects with needle plate 16 through aperture 80. A first transverse bore 44 is formed within nozzle plate 14 so that it connects with vertical bore 42. This first transverse bore 44 connects in turn to a second transverse bore 46 of larger cross sectional area. Bore 46 in turn connects to a third transverse bore 47 having yet a larger cross sectional area which extends through the outer surface of nozzle plate 14 and may include circumferentially disposed threads 49. Transverse bores 44 and 46 form a cylinder 45 for movable piston 48. A T shaped cap 50 includes a first threaded portion 52 and a second portion 54 which connects with portion 52 and is mounted outside the nozzle plate 14. Threaded portion 52 screws into threads 49 in the wall of bore 47 to hold cap 50 firmly in place during operation. O ring 56 extends about the circumference of the outer portion 54 of cap 50 to provide a fluid tight seal for cylinder 45. Cap 50 is removable to permit access to cylinder 45 and piston 48 by unscrewing the cap 50 so that these components may be cleaned periodically.

Piston 48 which is shown in its first position in FIG. 1, includes a first portion 60 of smaller cross sectional area which is slidable within smaller bore 44. A circumferential groove 62 is formed around portion 60 and an O ring 64 is disposed within groove 62 to provide a fluid tight seal with the inner walls of bore 44. A second O ring 66 is arranged about the circumference of the trailing end of portion 60. A second portion 70 of piston 48 has a larger cross sectional area than portion 60, and is configured to fit slidably within bore 46. The leading edge of piston portion 70 forms a cylindrical raised surface 69 adjacent to spacer 66. A circumferential groove 72 is formed in piston portion 70 and an O ring 74 is disposed within the groove 72 to provide a fluid tight seal with the inner wall of the bore 46. The trailing edge of the piston 48 is angled inward to form a circumferential sloping surface 76 the end of which abuts the portion 52 of cap 50 when the piston 48 is in its first position as seen in FIG. 1. A first and a second longitudinally disposed conduits 78 and 79 are formed in nozzle plate 14 so that they connect to cylinder 45 at points adjacent to its opposite ends.

Vertical bore 42 in nozzle plate 14 connects with aperture 80 which in turn connects to an array of substantially transversely oriented channels 81, best shown in FIGS. 2, 3 and 4, which are formed as recesses in the lower surface 82 of the nozzle plate 14. The needle plate 16 is attached to the surface 82 of the nozzle plate 14 so that dispensing needles such as 108, 110, 132 and 142 are arranged beneath the channel array 81. The upper surface 83 of the needle plate 16 encloses the recessed channels array 81 and a plurality of apertures 84 extend through the needle plate 16 to connect points on the channel array 81 with the individual dispensing needles. Each of the dispensing needles includes a centrally disposed longitudinal channel such as 108c of needle 108 which terminates in one or more dispensing apertures such as apertures 108a and 108b of needle 108. In needles 110 and 142 shown in FIG. 1, 110c and 142c designate the respective central channels and 110a and 110b and 142a and 142b are respectively the dispensing apertures of the needles 110 and 142. The central channel of each needle communicates with and is aligned substantially beneath one of the apertures 84 in needle plate 16.

In operation semi-fluid material enters the apparatus through supply channel 18 and passes through bore 30 where it is stopped by valve plate 36. Normally this material will be supplied in an aerated form under pressure. The head assembly 10 is then lowered so that the dispensing needles, such as 108, 110 and 142, pierce the bakery products which are to be filled with the semi-fluid material. Valve plate 36 is then moved so that aperture 40 comes into correspondance with portion 32 of bore 30 permitting the semi-fluid material to flow down bore 42 and through aperture 80 in the nozzle plate 14. From aperture 80 the material flows through the channels of channel array 81 and through apertures 84 in the needle plate 16 into the individual dispensing needles such as 108, 110 and 142. The semi-fluid material passes through the central channel in each needle such as 108c in needle 108 and out through the needle dispensing apertures 108a and 108b. The above described flow is facilitated by the fact that the semi-fluid material enters the apparatus 10 under pressure and is aerated so that it tends to expand.

After the valve plate 36 is opened, pressure of a fluid such as air entering cylinder 45 through passage 79 exerts pressure on the railing edge 76 of piston 48 causing the piston to move from its first position as depicted in FIG. 1. As seen in FIG. 1 piston 48 moves from right to left until spacer 66 abuts the left hand end 49 of enlarged bore 46 and the small end 60 of the piston moves through smaller bore 44 transmitting some pressure to vertical bore 42 which aids in the operation of injecting the material through the dispensing needles.

After the injection of semi-fluid material into one group of products is completed valve plate 36 moves so that aperture 40 is no longer in correspondance with bore 30 and the flow of material from manifold 12 is thereby interrupted. The entire assembly 10 is then raised so that the needles such as 108, 110 and 142 are withdrawn from the filled products. As the needles are being withdrawn a fluid such as air is inserted into cylinder 45 through passageway 78 and the flow of fluid through passageway 79 is terminated. Spacer 66 insures that the circumferential surface 69 forming the leading edge of portion 70 of piston 48 is spaced a predetermined distance from the left wall 49 of bore 46 such that the pressure of fluid entering bore 46 through passageway 78 presses against surface 69 of the piston 48. Because O rings 64 and 74 provide a fluid tight seal for bores 44 and 46 respectively the pressure applied causes the piston 48 to move from left to right as seen in FIG. 1 in cylinder 45 back to the position shown in FIG. 1.

As the piston 48 moves it creates a suction pressure which tends to suck the semi-fluid material back through the dispensing needles and channel array 81. This suction pressure counteracts the tendency of the aerated semi-fluid material to extrude through the dispensing needle apertures such as 108a and 108b of needle 108. As indicated above unless this extrusion of material is prevented semi-fluid material will be present on the exterior of the ends of the dispensing needles and will be dripped or smeared onto the exterior surface of bakery products either before or after filling. Because of the suction pressure exerted by the motion of piston 48, no material is extruded from the needles as the apparatus 10 is raised and it is prepared to be lowered for the next filling cycle as another group of bakery products moves into position.

FIGS. 2, 3 and 4 show one possible configuration of the channel array 81. A centrally disposed channel 100 connects with input aperture 80 and extends longitudinally along the underside 82 of nozzle plate 14. First and second U shaped channels 102 and 104 connect with channel 100 at junction points 101 and 103, respectively. Third and fourth U shaped channels 118 and 120 connect with central channel 100 at junction points 119 and 121 respectively. All of the channels of channel array 81 are of substantially equal cross sectional area. The overall array is configured such that the distance along the branching channels from the input aperture 80 to each of the dispensing needles is equal.

Looking to just those channels lying to the left of input aperture 100 as seen in FIG. 2, it will be seen that central channel 100 lies between input aperture 80 and all needles on that side. At junction point 101 U shaped channel 102 extends on one side to the input aperture to dispensing needle 108 and on the other side to the input aperture to needle 106. Measuring along channels 100 and 102 the inputs of needles 106 and 108 are equidistant from input aperture 80.

Channel 100 then continues through portion 114 which connects at junction point 119 with U shaped channel 118, the two sides of channel 118 terminate respectively at the input apertures of dispensing needles 128 and 132. The inputs of needles 128 and 132 are arranged so that they are at an equal distance measured along channels 118, 114 and 100 from input aperture 80, while the inputs of needles 106 and 108 are at this same distance from aperture 80 measured along channels 102 and 100.

Turning to the right portion of array 81 as seen in FIG. 2, it can be seen that the arrangement of channels is identical to that described above. A central channel 100 connects to a first U shaped channel 104 at junction point 103. U shaped channel 104 connects with the input apertures to dispensing needles 110 and 112 at its outer ends so that the inputs to needles 110 and 112 are equidistant from the input aperture 80. Central channel 116 is a continuation of channel 100 and connects junction point 103 to a second junction point 121. A second U shaped channel 120 connects with channel 116 at junction point 121 and connects with the input apertures of dispensing needles 138 and 142 at its outer ends. As described above the inputs to needles 138 and 142 are arranged to be equidistant from input aperture 80 along channels 120, 116 and 100. This distance is in turn equal to the distance from the input aperture 80 to the inputs to needles 110 and 112 measured along channels 100 and 104.

By arranging the inputs of all dispensing needles at an equal distance along the channel array 81 from the input aperture 80 and providing channels of equal cross sectional area it is possible to provide an equal fluid pressure at the input of each of the dispensing needles on needle plate 16 and thereby insure that the products to be filled by each of these needles will receive equal amounts of the material.

FIGS. 2, 3 and 4 show one way in which equal fluid pressure can be achieved at the input apertures of each dispensing needle utilizing an array of interconnected channels 81, connected to a single input aperture 80. Other alternative means for achieving this result would include providing channels of varying cross sectional area and arranging them such that the dispensing needles fartherest from input aperture 80 are fed by needles of the largest cross sectional area while those closest to input aperture 80 are fed by channels having the smallest cross sectional area. By properly adjusting the cross sectional areas of channels connecting the various dispensing needles with the source of semi-fluid material it is possible to again achieve an equal fluid pressure at the input of each dispensing needle.

Clearly rather then varying distance or cross sectional area alone, a combination of distance from the source of the material which here is aperture 80 and the cross sectional area of channels linking that source to each of the dispensing needles may be utilized to provide the desired result which is an equal fluid pressure at the input of each needle connected to needle plate 16. A virtually infinite variety of channel geometries may be utilized to achieve equal pressure at the input of each of the dispensing needles but all such geometries will involve the choice of distance from the source and cross sectional area of channels from each needle to the source so as to equalize the fluid pressures at the input of each needle.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. Dispensing apparatus for semi-fluid material including a source of said material;
   valve means disposed adjacent to said source;
   a housing having a first bore connecting with said source through said valve means and a second bore having one end opening into said first bore;
   a piston slidably mounted within said second bore said piston being movable between a first predetermined position spaced from said one end of said second bore and a second predetermined position adjacent to said one end of said second bore, said piston including a first and a second surfaces;
   a first and a second passage formed in said housing, said first and second passages opening respectively into said second bore at first and second longitudinally spaced points, said first point being adjacent to said first piston surface when said piston is in said first predetermined position and said second point being adjacent to said second piston surface when said piston is in said second predetermined position;
   means to alternately supply fluid to said first and second passages to cause said piston to move back and forth between said first and second predetermined positions;
   said second bore including a first portion of smaller cross sectional area and a second portion of larger cross sectional area then said first cross sectional area, said first and second points being adjacent respectively to first and second ends of said second portion and in which said piston includes a first portion of smaller cross sectional area which is slidable within said first portion of said second bore as said piston moves between said first and second positions and a second portion of larger cross sectional area which is slidable within said second portion of said second bore as said piston moves between said first and second positions, said first and second surfaces being formed respectively on opposed sides of said second portion of said piston; and
   a spacer comprising an O-ring mounted about the outer surface of said first portion of said piston adjacent to said second surface to space said second surface, a predetermined distance from said second end of said second portion when said piston is in said second position adjacent to said second point.

2. Dispensing apparatus for semi fluid material including a source of said material;
   a housing having a first surface and a bore extending between said source and an output aperture on said first surface;
   means to control the flow of material through said bore;
   an array of interconnected channels formed in said first surface of said housing, said array of channels communicating with and branching outwardly from said output aperture;
   a plate-like member attached to said first surface of said housing having a first side which covers and encloses said array of channels and a plurality of apertures communicating with predetermined points along said array of channels and extending through said plate-like member from said first side to a second side;
   a plurality of dispensing members attached to said second side of said plate-like member, each of said dispensing members communicating with one of said apertures in said plate-like member; and
   said array of channel being configured such that the combination of the distance along said array of channels from said output aperture to each of said predetermined points and the cross sectional areas of the channels in said array of channels between each of said predetermined points and said output aperture will provide an equal fluid pressure at each said predetermined point.

3. Dispensing apparatus as claimed in claim 2 in which all of the channels of said array of channels are of substantially equal cross sectional area and in which the distance measured along said array of channels from said output aperture to any one of said predetermined points is equal to the distance measured along said array of channels from said output aperture to any other one of said predetermined points.

* * * * *